United States Patent [19]

Sipos

[11] Patent Number: 5,251,493
[45] Date of Patent: Oct. 12, 1993

[54] LOAD CELL FOR WELL TUBULARS OR THE LIKE

[75] Inventor: David L. Sipos, Friendswood, Tex.
[73] Assignee: Bowen Tools, Inc., Houston, Tex.
[21] Appl. No.: 672,376
[22] Filed: Mar. 20, 1991
[51] Int. Cl.$^5$ .............................................. G01L 1/02
[52] U.S. Cl. .................. 73/862.584; 177/208
[58] Field of Search ................... 73/151, 862.58; 177/208, 209; 166/77, 250, 113

[56] References Cited

U.S. PATENT DOCUMENTS

| | | | |
|---|---|---|---|
| 2,022,203 | 11/1935 | Hughes | 73/862.58 |
| 2,708,367 | 5/1955 | Lusk | 73/862.58 |
| 3,182,877 | 5/1965 | Slator et al. | 226/172 |
| 3,273,470 | 9/1966 | Bradley | 73/862.584 |
| 3,285,485 | 11/1966 | Slator | 226/172 |
| 3,313,346 | 4/1967 | Cross | 166/352 |
| 3,359,791 | 12/1967 | Pantages | 73/151 |
| 3,613,517 | 10/1971 | Bradley et al. | 177/208 |
| 3,658,270 | 4/1972 | Slator et al. | 242/54 R |
| 3,675,719 | 7/1972 | Slator et al. | 166/297 |
| 3,690,136 | 9/1972 | Slator et al. | 72/160 |
| 3,690,381 | 9/1972 | Slator et al. | 166/384 |
| 3,695,100 | 10/1972 | Mitchell | 73/862.58 |
| 3,722,594 | 3/1973 | Smith et al. | 166/307 |
| 3,889,529 | 6/1975 | Bradley | 73/862.58 |
| 4,450,906 | 5/1984 | Firmin | 166/113 |
| 4,793,410 | 12/1988 | Sipos et al. | 166/77 |
| 4,842,058 | 6/1989 | Sipos et al. | 166/77 |

OTHER PUBLICATIONS

"Bowen Coiled Tubing Systems," Bowen Tools, Inc.

*Primary Examiner*—Hezron E. Williams
*Assistant Examiner*—Michael Brock
*Attorney, Agent, or Firm*—Pravel, Hewitt, Kimball & Krieger

[57] ABSTRACT

Methods and apparatuses, in one aspect, for detecting and indicating loads and/or forces on tubular strings, e.g. tubing, injected into or withdrawn out of a well by an injector apparatus, the apparatus having, in one embodiment, a single piston acting on a single boot with a chamber therein having a fluid the compression of which in response to a load or a change in load is sensed to indicate the load on the apparatus; the indicator in one embodiment having a spring to add to the weight of the injector apparatus to provide a positive pre-load so that negative loads can be determined by a change in positive pressure without requiring negative pressure; and a pressure chamber device for use with such apparatuses and in such methods.

2 Claims, 3 Drawing Sheets

LOAD CELL FOR WELL TUBULARS OR THE LIKE

BACKGROUND OF THE INVENTION

1. Field of the Invention

This invention is directed to apparatus for detecting and indicating loads or forces on tubular strings in wells or boreholes, and, in one aspect, to such apparatus for well tubing supported by an injector head that moves the tubing into and out of a well.

2. Description of Related Art

The prior art discloses a variety of load cells and indicators, several of which require the use of dual pistons and dual pressure gauges and seal rings that surround circular shaped parts. For example, U.S. Pat. No. 4,793,410 (commonly owned with the present invention) discloses a load cell which has two pressure chambers with a movable piston mounted in each chamber. One piston moves in response to downward force on the indicator and one piston moves in response to upward force on the indicator. A channel is provided in communication with each chamber to which a pressure or load indicating gauge may be attached. Seal rings are used with each piston to seal off the chambers so that accurate measurements are taken. The pistons must be very well aligned with the interior chamber walls so that they do not bind the pistons causing the cell to lock up. An injector head disposed on the cell by securing it to a top plate of the cell must be fairly well aligned with the cell's bore so that this type of misalignment will not occur.

U.S. Pat. Nos. 3,182,877 and 3,285,485 (both commonly owned With the present invention) also disclose two-piston, two-chamber, two-gauge sealed-piston load indicators which must be fairly precisely aligned with an injector head or other apparatus disposed above them.

The following U.S. patents disclose typical well tubing injector and hanger assemblies: U.S. Pat. Nos. 3,658,270; 3,675,719; 3,690,136; and 3,690,381—all commonly owned with the present invention; and U.S. Pat. Nos. 3,722,594 and 3,313,346. "Bowen Coiled Tubing Systems," Bowen Tools, Inc. shows a tubing injector head mounted above a load cell (page 2).

There has long been a need for a load cell with increased accuracy. There has long been a need for a load cell which does not malfunction due to the deposit of debris therein. There has long been a need for a load cell which can accurately indicate relatively small changes in load. There has long been a need for a cell which can function adequately despite some apparatus misalignment. There has long been a need for a load cell which can indicate a load independent of the weight of an apparatus (e.g. an injector head) secured to or mounted on the indicator. There has long been a need for a load cell with no "dead band," no hysteresis because of tare load, i.e. weight on the indicator (e.g. an injector head) that is not to be measured.

SUMMARY OF THE PRESENT INVENTION

The present invention, in one embodiment, is directed to a hydro-mechanical load cell for detecting and indicating the load of a tubular string and changes in that load in two directions (e.g. up and down; left and right), particularly changes due to the string contacting an object in a well. In one embodiment, a load cell according to the present invention has a piston-plate assembly above which is movably mounted a load-bearing assembly. An apparatus, e.g. a tubing injector head, is mounted on the load-bearing assembly and the load of the head and any tubing it supports is transferred from the load-bearing assembly to the piston-plate assembly. A gauge on the piston-plate assembly indicates the amount of load and/or force on the load-bearing assembly.

The load-bearing assembly, in one embodiment, includes a spring cartridge with a spring of predetermined force that augments the downward force due to the weight of the injector head, thus providing a positive pre-load, a positive downward force when the cell is used in a vertical configuration, which then becomes the negative capacity of the cell. A movable assembly, in one embodiment, is disposed between the load-bearing assembly and the piston-plate assembly and has a compressible boot with a single interior chamber which is acted on by the force of the weight imposed on the load-bearing assembly so that a piston of the piston-plate assembly compresses the boot. The indicator gauge intercommunicates with a channel to the boot's interior so that the pressure therein, and changes in pressure therein, are indicated.

In one embodiment, an upper opening between the spring cartridge sub-assembly and the piston-plate sub-assembly is blocked (partially or completely) by a dam tube. When a top cover plate of the spring-cartridge assembly is in an elevated position, a lip of the dam tube contacts the cover plate blocking virtually all unwanted material from flowing down into a space around the spring. As the injector plate moves down, the opening is somewhat exposed.

In one embodiment, a diaphragm disposed within the indicator prevents material which has flowed down about the spring from flowing back up to a space between the movable sub-assembly and the spring cartridge sub-assembly.

In one embodiment, the movable assembly has a bearing surface for aligning the movable assembly with the piston plate assembly. In a preferred embodiment, this bearing surface is slightly curved so that a load cell can still function when the spring cartridge sub-assembly is misaligned (e.g. due to misalignment of an apparatus such as an injector head which is secured to the movable assembly) with the piston-plate sub-assembly, rather than having a malfunction or system lock-up.

Accurate positioning of an injector head can be provided by directly bolting the head to the indicator according to this invention. This reduces alignment problems.

Load indicators according to this invention are provided in which a positive pre-load (a downward force when the indicator is disposed vertically) on a pressure chamber is zeroed out; e.g. a 5000 pound head's force and an additional spring force downwardly produce a certain positive gauge reading. The gauge is then set to zero at that reading. Thus, any additional positive load (e.g. the weight of tubing injected into a wellbore below the head) produces an increased positive gauge reading; but any negative load (i.e. a force opposed to the downward positive load force) will cause a decrease in the gauge reading—all the while the pressure in the pressure chamber, although changing and possibly decreasing, remains positive up to the limit of the positive pre-load. Any practical desired positive pre-load may be employed by appropriate spring selection. This use of a positive pre-load significantly reduces or eliminates the dead band or hysteresis encountered with prior art devices.

In one embodiment of the present invention, a particular pressure chamber is provided which includes a wall defining a chamber to be filled with fluid under pressure and flanges extending outwardly from the wall for sealing mounting of the pressure chamber adjacent a plate, e.g. an injector plate. In certain embodiments, the wall defining the pressure chamber presents an open face to the adjacent plate. In certain embodiments, the pressure chamber is made from a relatively strong material, e.g. Kevlar TM material or Aramid TM material.

It is, therefore, an object of at least certain preferred embodiments of the present invention to provide:

new, useful, unique, efficient, nonobvious and effective devices and methods for detecting and indicating a load and/or force on a tubular string suspended from the surface opening of a well bore;

devices and methods which give accurate load/force measurement and which can indicate relatively small changes in such measurements;

methods and devices which give nearly instantaneous indications in load change by providing for counteracting the weight of apparatuses used to move a tubular string;

methods and devices in which internal frictional drag is reduced so that more accurate and quicker load measurements are possible;

methods and devices which employ an annular pressure chamber to bear the loads, and the annular pressure chamber itself, particularly an annular pressure chamber with mounting flanges and made from sturdy material;

such devices in which debris is prevented from flowing to parts of the device and from impeding coaction of certain parts;

load cell with which misalignment with an injector head is reduced or eliminated;

a load cell which has an apparatus, e.g. an injector head, secured to it and yet which provides an indication of a load independent of the weight of the apparatus; and methods and devices with which even small negative loads can be sensed and measured.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THIS PATENT

Figure 1:
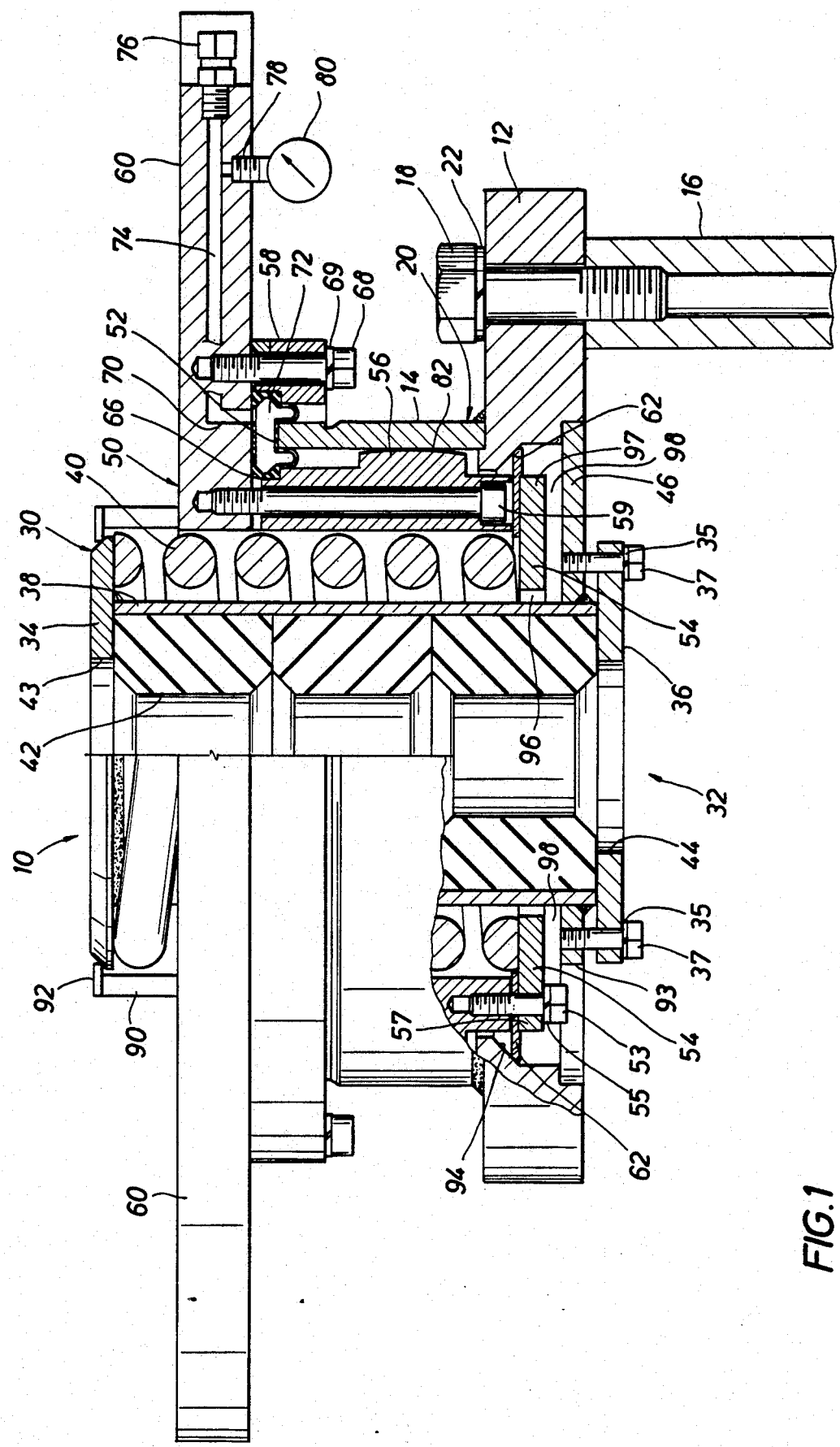
FIG. 1 is a side view partially in cross-section of a load cell according to the present invention.

Referring now to FIG. 1, a load cell 10 according to the present invention has a plate-piston sub-assembly 20 with a bottom plate 12 to which is welded a cylindrical piston 14 which extends upwardly from the bottom plate 12. The plate-12-piston 14 sub-assembly 20 is bolted to four posts 16 (one shown) with bolts 18 and lock washers 22.

A spring cartridge sub-assembly 30 is mounted in a thrust plate 54 that moves with respect to the plate-piston sub-assembly 20.

A movable sub-assembly 50 partially encloses the spring cartridge sub-assembly 30. As set forth in detail below, the sub-assembly 50 is acted on by the spring 40 which transfers the weight imposed on the spring cartridge sub-assembly to a boot 52 of the boot assembly. The spring-cartridge sub-assembly 30 adds (as a positive downward force) to the weight of an injector head (not shown) disposed above the load cell 10 and the weight of tubing or other tubulars in a borehole below the head which are supported by the head. This weight forcing the spring sub-assembly 50 downwardly impresses a load on the U-boot 52, pushing the U-boot against the piston 14 and thus compressing hydraulic fluid in the U-boot. A measurement of this change in compression indicates the load on the cell The spring cartridge sub-assembly 30 includes these items:

| | |
|---|---|
| core | 32 |
| top plate | 34 |
| bottom cover plate | 36 |
| inner pipe | 38 |
| spring | 40 |
| pilot plate | 46 |
| U-boot | 52 |
| thrust plate | 54 |

The core 32 has the core top cover plate 34 welded to the inner pipe 38. The pilot plate 46 is also welded to the inner pipe 38. The bottom cover plate 36 is mounted by bolts 37 and lock washers 35 to the pilot plate 46. The spring 40 encircles the inner pipe 38. A channel 42 extends through the core 32 and communicates with a channel 43 in the top plate 34 and a channel 44 in the bottom cover plate 36. Tubulars injected by the head move through the channels 42, 43, and 44 into a hole (not shown) below the load indicator 10.

The sub-assembly 50 includes these items:

| | |
|---|---|
| boot | 52 |
| quill | 56 |
| annulet | 58 |
| injector plate | 60 |
| diaphragm | 62 |

The spring 40 is urged against the thrust plate 54. The plate 54 is bolted to the quill 56 by bolts 53 and lock washers 55. The diaphragm 62 is held between the quill 56 and the plate 54 by these bolts. In the area of the diaphragm, the bolts are surrounded by thrust washers 57. The quill 56 is bolted to the injector plate 60 by bolts 59. The boot 52 is held in place by an upper portion 66 of the quill 56 and the annulet 58 which is bolted to the injector plate 60 with bolts 68 and lock washers 69.

A channel 70 is in fluid communication both with an interior chamber 72 of the boot 52 and with a channel 74 that extends to a purge valve 76. In one embodiment of the invention, there are four such channel series and purge valves spaced at 90 degree intervals. Additional gauges may be used as desired including pressure gauges reading in pounds, in kilograms, or in p.s.i. in communication with any of the channels. A gauge channel 78 extends from one of the channels 74. A gauge 80 is connected to the gauge channel 78 and indicates the pressure of a fluid within the chamber 72.

A bearing surface 82 on the exterior of the quill 56 provides a "sloppy" fit between the quill and an inner wall of piston 14. There is little or no frictional drag between the surface 82 and the piston 14 and the surface 82 is slightly curved (convex with respect to the piston's inner surface) so that minor misalignments between the quill and the piston (e.g. misalignments due to imperfect location of an injector head on a support skid) do not result in a binding that would prevent the injection of tubulars into a hole or their removal. It is preferred that no circumferential seals be used between the quill 56 and the piston cylinder 14.

To prevent the flow of debris and other undesirable material into the space in which the spring 40 is disposed, a dam tube 90, preferably made from nylon, is secured on top of the injector plate 60. A lip 92 of the dam tube 90 contacts the core top cover plate 34 when the cover plate 34 is in the position shown in FIG. 1. Any material that does pass by the dam tube 90 (e.g. when the cover plate 34 is lowered) is prevented from flowing up to the space between the quill 56 and the piston cylinder 14 by the diaphragm 62. The diaphragm 62 contacts an inner surface 94 of the bottom plate 12. If material is forced under pressure past the dam tube 90, into and through an opening 96 in the floating thrust plate 54, into and through a space 98 between the floating plate 54 and the mounting plate 46 and around an end 97 of the mounting plate 46; then the pressure of the material and/or any fluid in which it is entrained forces the diaphragm 62 against the surface 94 of the plate 12 so that the material is prevented from further upward flow, particularly further flow into the space between the quill 56 and the piston cylinder 14. Debris/unwanted material can flow out through holes 93 (one shown) in the plate 46.

Figure 2:
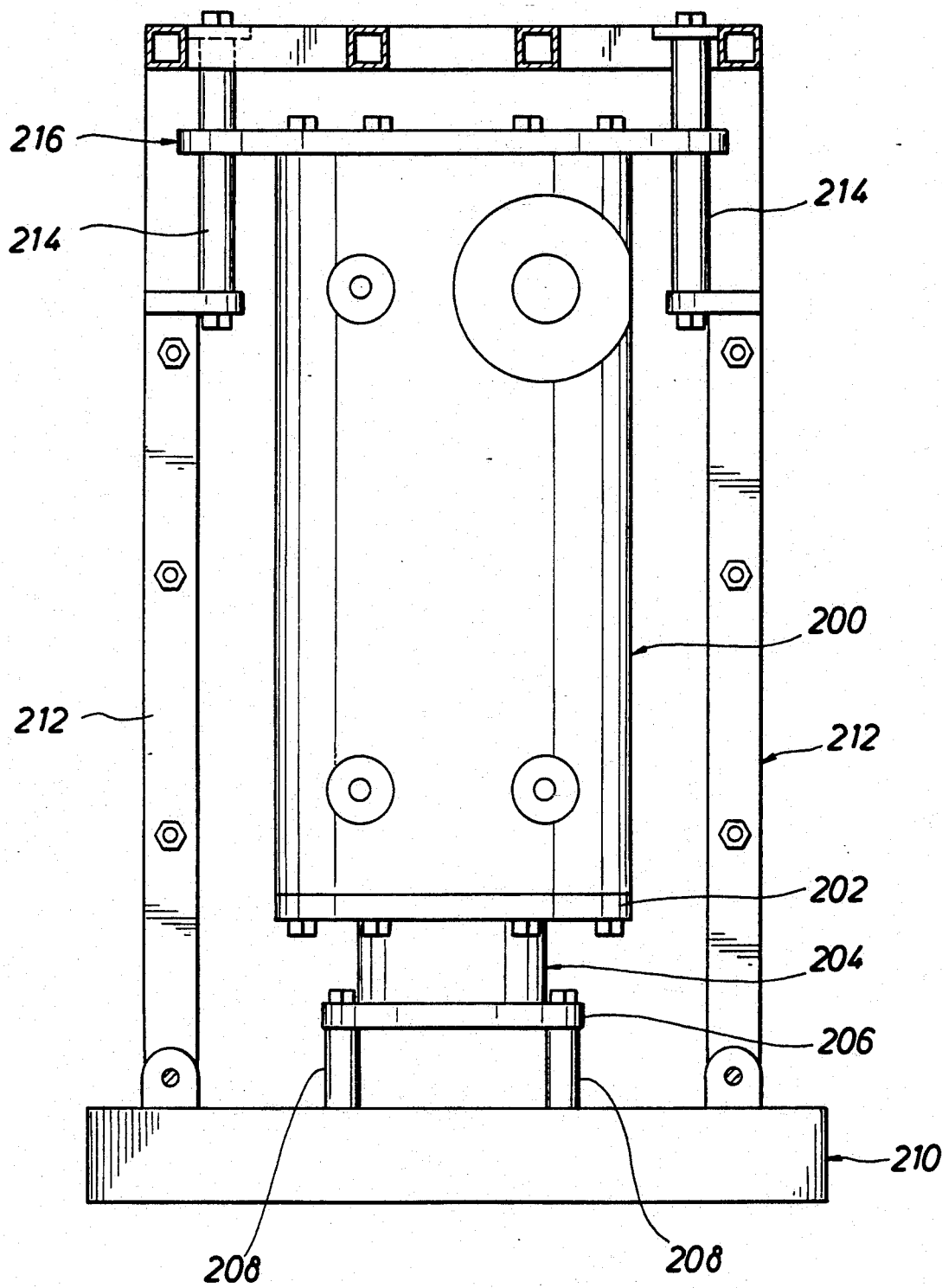
FIG. 2 is a side view of a load indicator according to the present invention disposed beneath a tubing injector head.

As shown in FIG. 2, an injector head 200 is disposed on an injector plate 202 (like injector plate 60, FIG. 1) of a load cell 204 according to the present invention (like load cell 10, FIG. 1). Via a bottom mounting plate 206 (like bottom mounting plate 46, FIG. 1) the cell 204 is mounted to posts 208 (like posts 16, FIG. 1) which in turn are mounted to a skid 210. A frame 212 mounted to the skid 210 has upper posts 214 secured to it. The upper posts 214 are secured to an upper plate 216 which in turn is secured to the top of the head 200 to provide stability and alignment.

A load cell (e.g. cells 10 and 204) according to at least certain preferred embodiments of the present invention is relatively more sensitive than prior art cells since friction is substantially eliminated. With the head in place, the indicator's gauge can be set at zero so that the spring force in addition to the weight of the head will give a zero reading—adding any weight (positive downward force) produces a reading greater than zero and any reduction in force or weight (e.g. an upward force resulting from the tubing encountering an object in a wellbore) is indicated as a negative reading or as a changed reading. Since there is little or no drag, e.g. drag due to circumferential seals around a piston, any excess force will deform the boot and result in a changed gauge reading. For example, with a typical 5000 pound head and a spring force of 5000 pounds, a load cell according to this invention can read from −10,000 pounds to +50,000 pounds and it can do so with relatively good accuracy within e.g. ±25 pounds since the 5000 pound load of the head need not be lifted first before other weight is registered. Thus, both the force with which a tubular string is pushed into a hole and small changes in that force are indicated by load cells according to this invention; and changes in that force due to the tubular string (or something attached to it) contacting the hole wall, the bottom of the hole, or an item in the hole are also indicated. Registration of even a slight change in pressure can thus indicate the location of an item in the hole.

Different cores with different size through-channels may be used to accommodate different size tubulars; e.g. for tubing ranging between 1 inch to 1¼ inches in diameter one core may be used; for tubing ranging between 1¼ inches to 1¾ inches another core may be used; and for tubing of 2 inch diameter yet another core may be used.

Due to the curved surface on the quill 56 and the lack of circumferential seals around the piston cylinder 14 in certain preferred embodiments of load cells according to the present invention, angular displacements of the spring cartridge (e.g. caused by head misalignment) can be tolerated, preferably, e.g. up to about 3 degrees of angular displacement, without locking-up the injector head.

Figure 3:
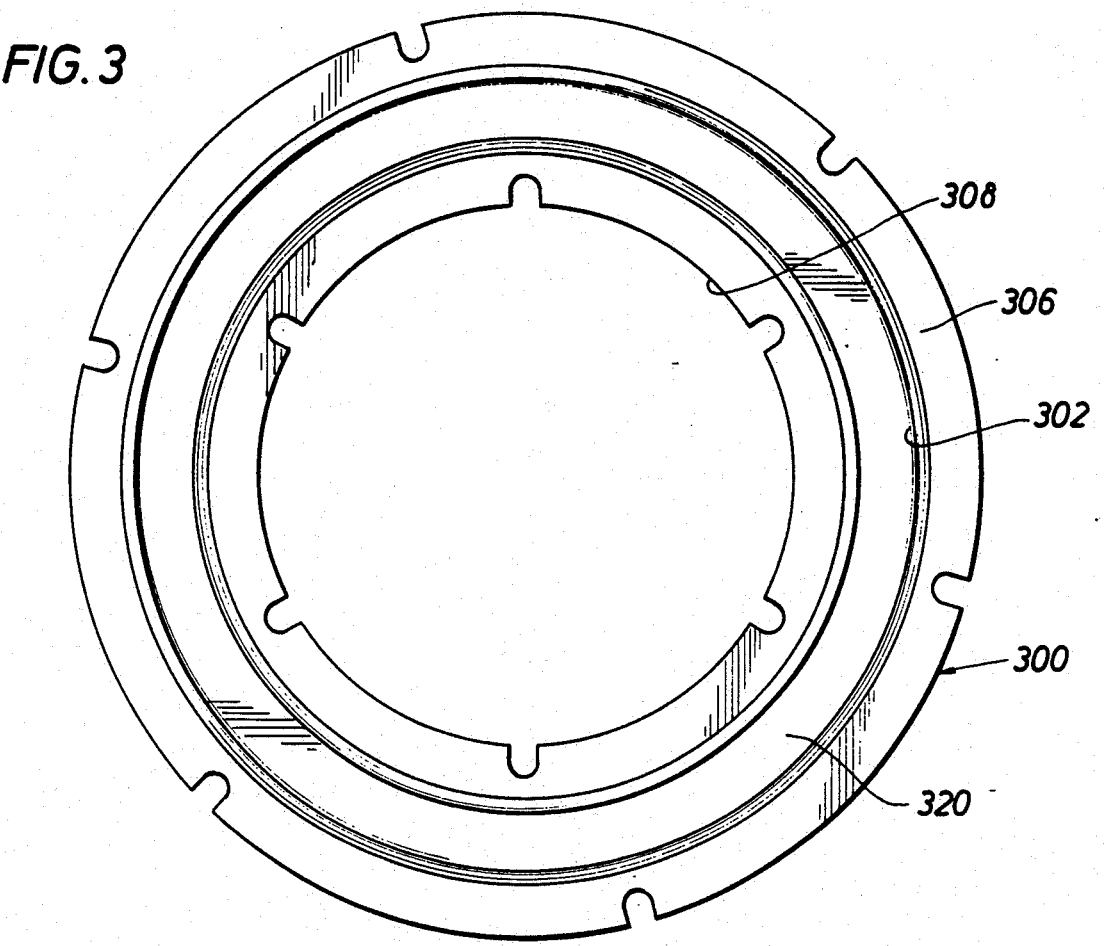
FIG. 3 is a top view of a pressure chamber device according to the present invention.
Figure 4:
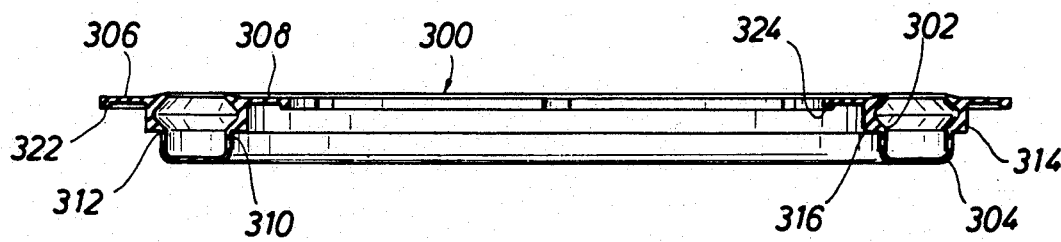
FIG. 4 is a side cross-sectional view of the device of FIG. 3.

FIGS. 3 and 4 illustrate a pressure chamber device 300 (like the U-boot 52, FIG. 1) which has a pressure chamber 302 defined by a wall 304. Two flanges 306, 308 extend outwardly from the top of the pressure chamber 302 to facilitate mounting of the device 300 (e.g. as by bolts 68 and 59, FIG. 1). The wall 304 has recesses 310, 312 which are formed to receive portions of a back-up structure (e.g. the annulet 58 and the upper portion 66 of quill 56, FIG. 1) to buttress the device 300. Enlarged shoulders 314, 316 also have an exterior surface which can be abutted by a buttressing back-up structure. An opening 320 at the top of the pressure chamber 302 is sealingly closed off by a plate (e.g. injector plate 60, FIG. 1) adjacent which the device 300 is mounted. Tabs 322 and 324 extending from the flanges 306, 308 respectively abut mounting bolts and inhibit or prevent movement of the device 300 with respect to the bolts or mounting apparatus.

Figure 5:
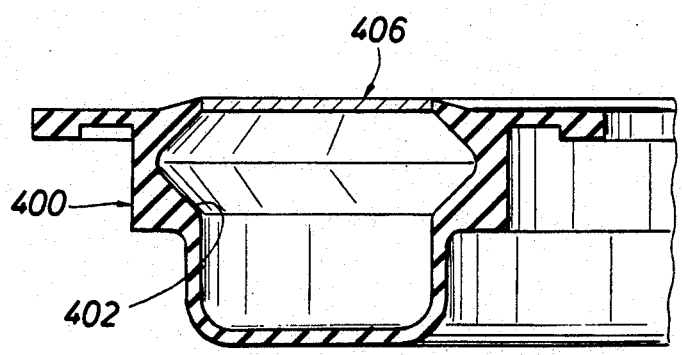
FIG. 5 is a side cross-sectional view of a pressure chamber device according to the present invention.

FIG. 5 illustrates a pressure chamber device 400 like the device 300 (FIG. 3), but a pressure chamber 402 has no top opening and is closed off by a top wall 406. It is preferred that the devices 300, 400 be made from a strong material; e.g. Kevlar TM material or Aramid TM material.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A load indictor comprising
   a stationary assembly having a piston means including an inner surface,
   a movable assembly including a body member, a pressure chamber means containing fluid and mounted to the body member, and bearing means for contacting the inner surface of said piston means for positioning of the movable assembly relative to the stationary assembly;
   seal means for sealing off a space between the bearing means and the piston means to inhibit debris from entering the space;
   wherein the seal means is a diaphragm secured to the body member of which the bearing member means is a part, and force of material moving toward the space forces the diaphragm against a plate to which the piston means is secured to close off the space.

2. A load indicator comprising
   a stationary assembly having piston means, said piston means having an inner surface,
   a movable assembly including,
   a body member, and
   a pressure chamber means containing fluid and mounted to the body member and contacting the piston means,
   gauge means intercommunicating with the pressure chamber means for indicating pressure of the fluid, and
   preload means for forcing the pressure chamber means against the piston means, compressing the fluid in the pressure chamber means and changing the pressure of the fluid therein, said preload means allowing the gauge means to indicate positive and negative changes in load while the pressure remains positive;
   the movable assembly has bearing member means for contacting the inner surface of the piston means for positioning of the movable assembly with respect to the stationary assembly; and
   seal means for sealing off a space between the bearing member means and the piston means to inhibit debris from entering the space;
   wherein the seal means is a diaphragm secured to the body member of which the bearing member means is a part, and force of material moving toward the space forces the diaphragm against a plate to which the piston means is secured to close off the space.

* * * * *